H. M. BARBER.
DELIVERY MECHANISM FOR SHEET FEED ROTARY PRESSES.
APPLICATION FILED SEPT. 21, 1915.
1,245,550.
Patented Nov. 6, 1917.
7 SHEETS—SHEET 2.
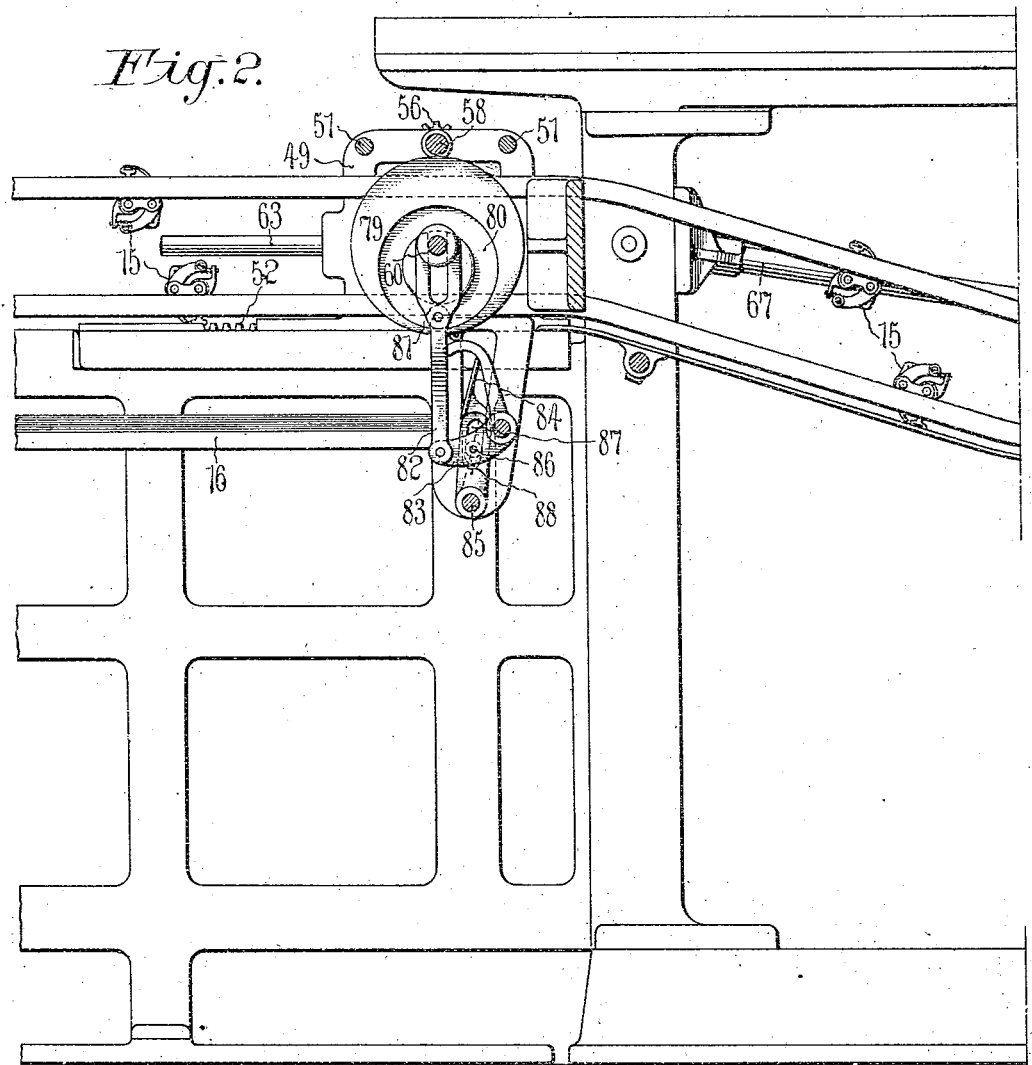
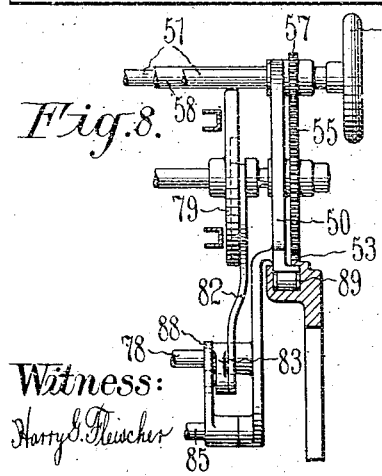
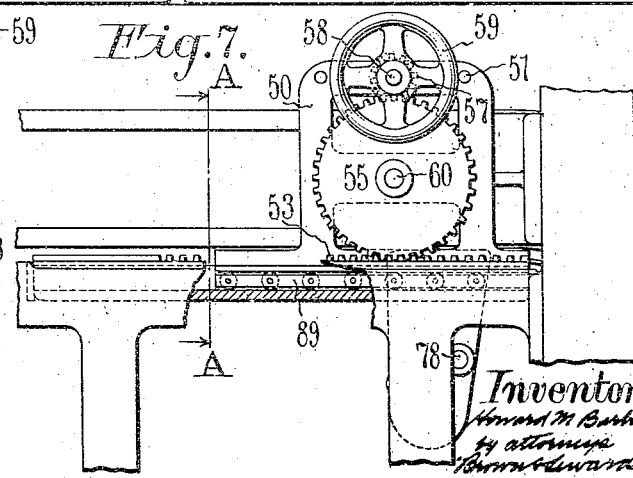

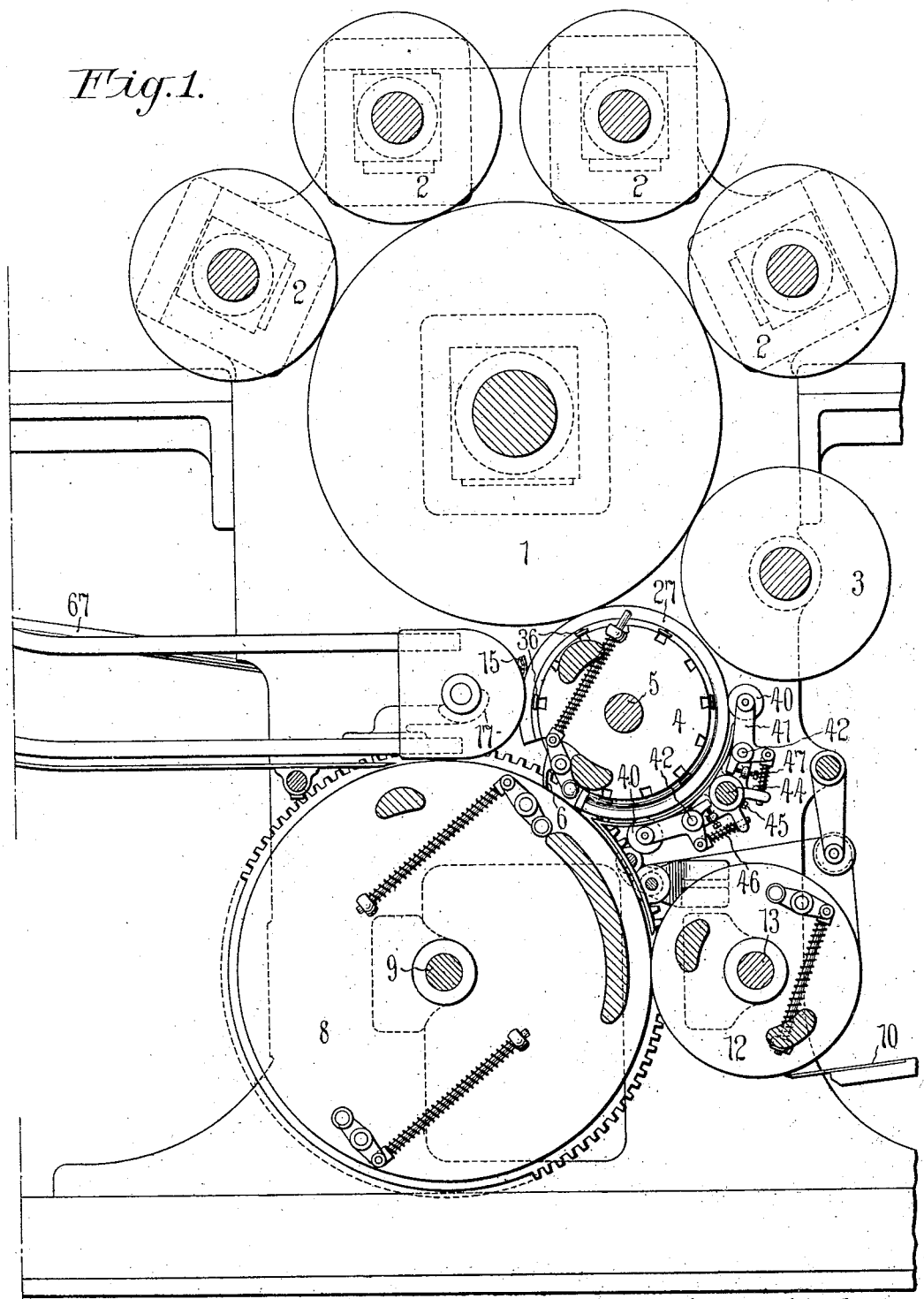

H. M. BARBER.
DELIVERY MECHANISM FOR SHEET FEED ROTARY PRESSES.
APPLICATION FILED SEPT. 21, 1915.

1,245,550.

Patented Nov. 6, 1917.
7 SHEETS—SHEET 3.

Witness: Harry J. Fleischer

Inventor:

H. M. BARBER.
DELIVERY MECHANISM FOR SHEET FEED ROTARY PRESSES.
APPLICATION FILED SEPT. 21, 1915.

1,245,550.

Patented Nov. 6, 1917.
7 SHEETS—SHEET 4.

Witness:
Harry G. Fleischer

Inventor:
Howard M. Barber
by attorneys

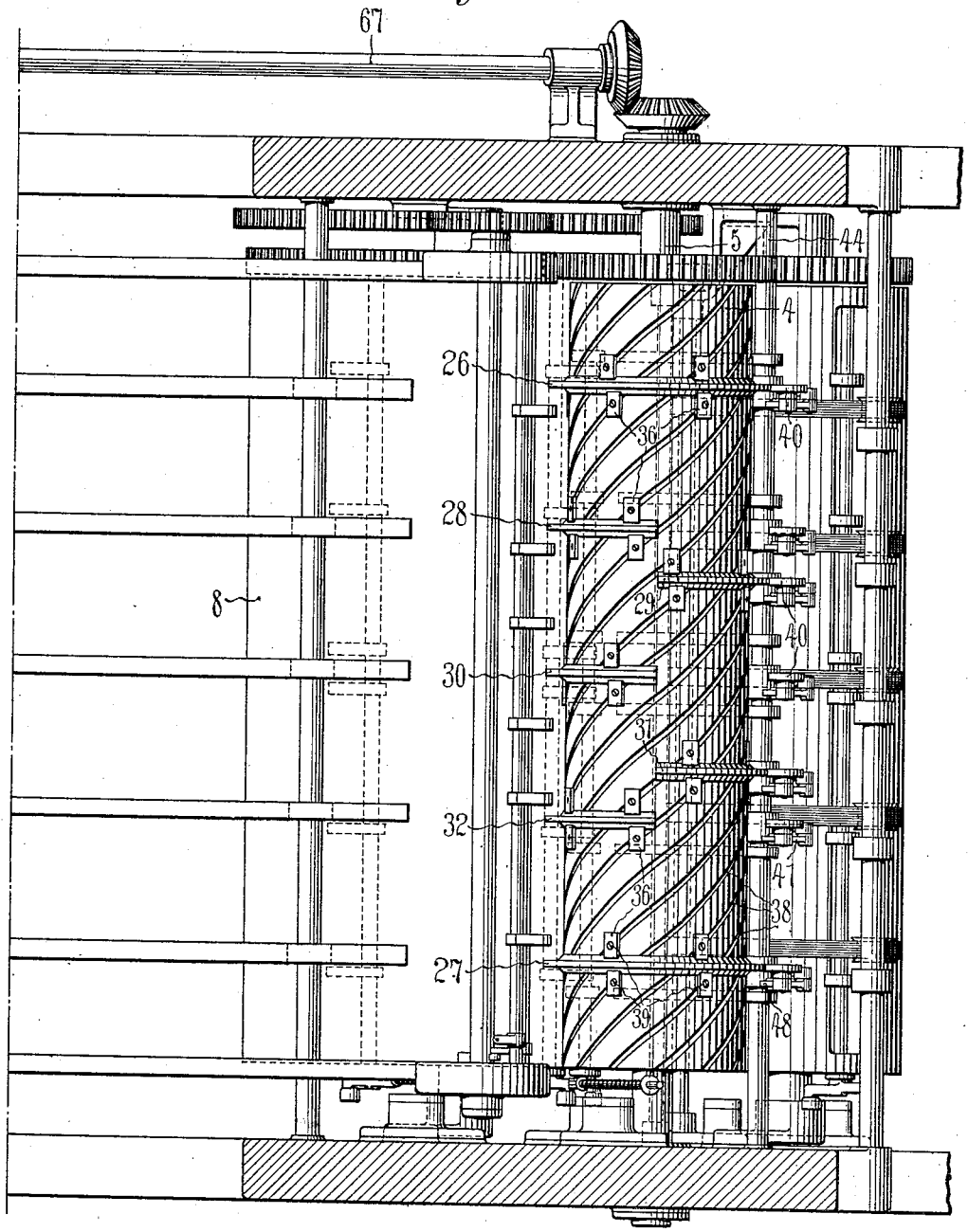

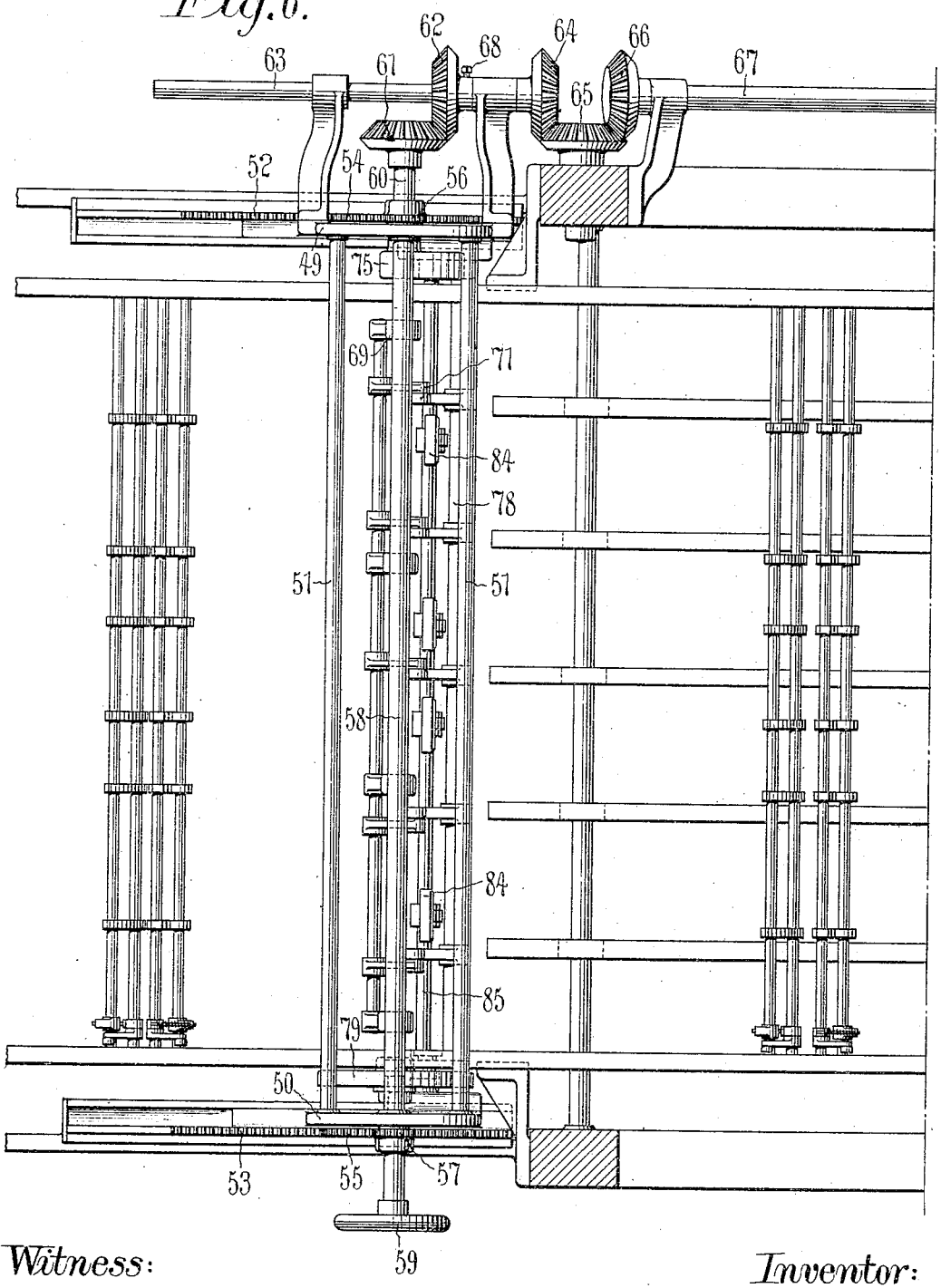

H. M. BARBER.
DELIVERY MECHANISM FOR SHEET FEED ROTARY PRESSES.
APPLICATION FILED SEPT. 21, 1915.
1,245,550.
Patented Nov. 6, 1917.
7 SHEETS—SHEET 7.
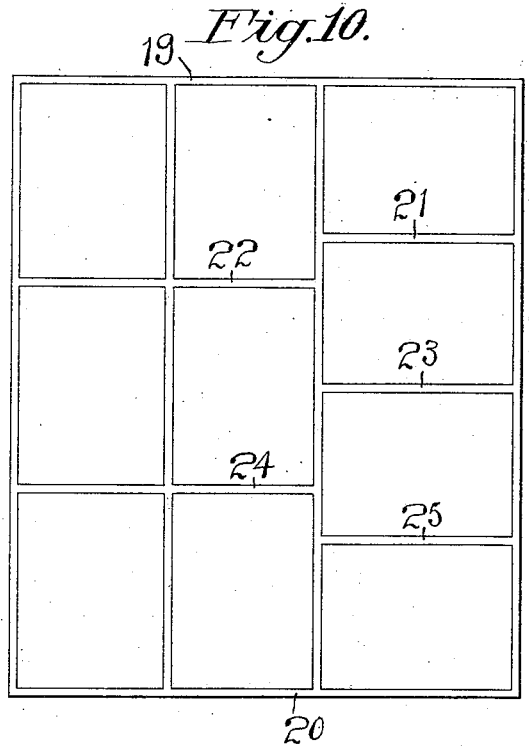
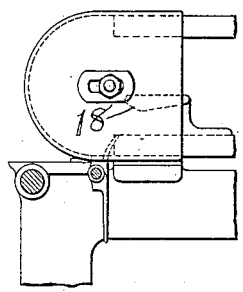
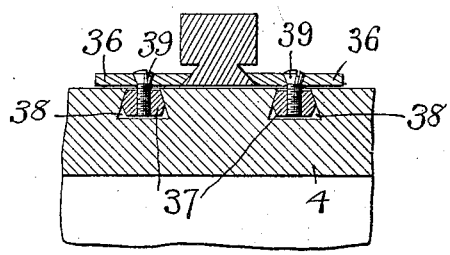
Witness:- Harry G. Fleischer
Inventor:- Howard M. Barber

UNITED STATES PATENT OFFICE.

HOWARD M. BARBER, OF STONINGTON, CONNECTICUT, ASSIGNOR TO C. B. COTTRELL & SONS COMPANY, OF NEW YORK, N. Y., A CORPORATION OF DELAWARE.

DELIVERY MECHANISM FOR SHEET-FEED ROTARY PRESSES.

1,245,550.      Specification of Letters Patent.      Patented Nov. 6, 1917.

Application filed September 21, 1915. Serial No. 51,787.

*To all whom it may concern:*

Be it known that I, HOWARD M. BARBER, a citizen of the United States, and resident of Stonington, in the county of New London and State of Connecticut, have invented a new and useful Improvement in Delivery Mechanism for Sheet-Feed Rotary Presses, of which the following is a specification.

The object of this invention is to provide a delivery mechanism for printing presses which will successfully deliver sheets of various sizes and with various arrangements of margins either continuous or staggered, without smutting or smearing the printed matter on said sheets.

The invention includes a delivery cylinder having marginal risers which can be so arranged as to support the printed sheet by its margins only and thus space the freshly printed face of the sheet from the surface of the delivery cylinder.

The invention also includes means for maintaining control of the printed sheet until its head has been engaged by the delivery carrier grippers.

The invention also includes means arranged to feed in slip sheets if so desired, to be associated with the printed sheets as they are engaged by the delivery carrier grippers.

The invention includes also means for retarding the sheets from their back edges as they are released by the delivery carrier grippers, said retarding means being adjustable for different lengths of sheets and comprises coacting rotary and oscillating members for engaging the sheets.

A practical embodiment of my invention is represented in the accompanying drawings in which, Figure 1 is a detail vertical section taken from front to rear through a sheet feed rotary printing press embodying my invention.

Fig. 2 is an extension of the same.

Fig. 5 is a detail horizontal section through the machine.

Fig. 6 is an extension of the same.

Fig. 7 is a detail side view of the sheet retarding mechanism.

Fig. 8 is a detail cross section in the plane of the line A—A of Fig. 7.

Fig. 10 is a plan view of the sheet showing certain of its longitudinal margins staggered with respect to the other longitudinal margins.

Fig. 11 is a detail vertical section at the rear end of the endless delivery carrier, and Fig. 12 is an enlarged detail section through one of the marginal risers, showing the means for securing the same to the delivery cylinder.

Figure 3:
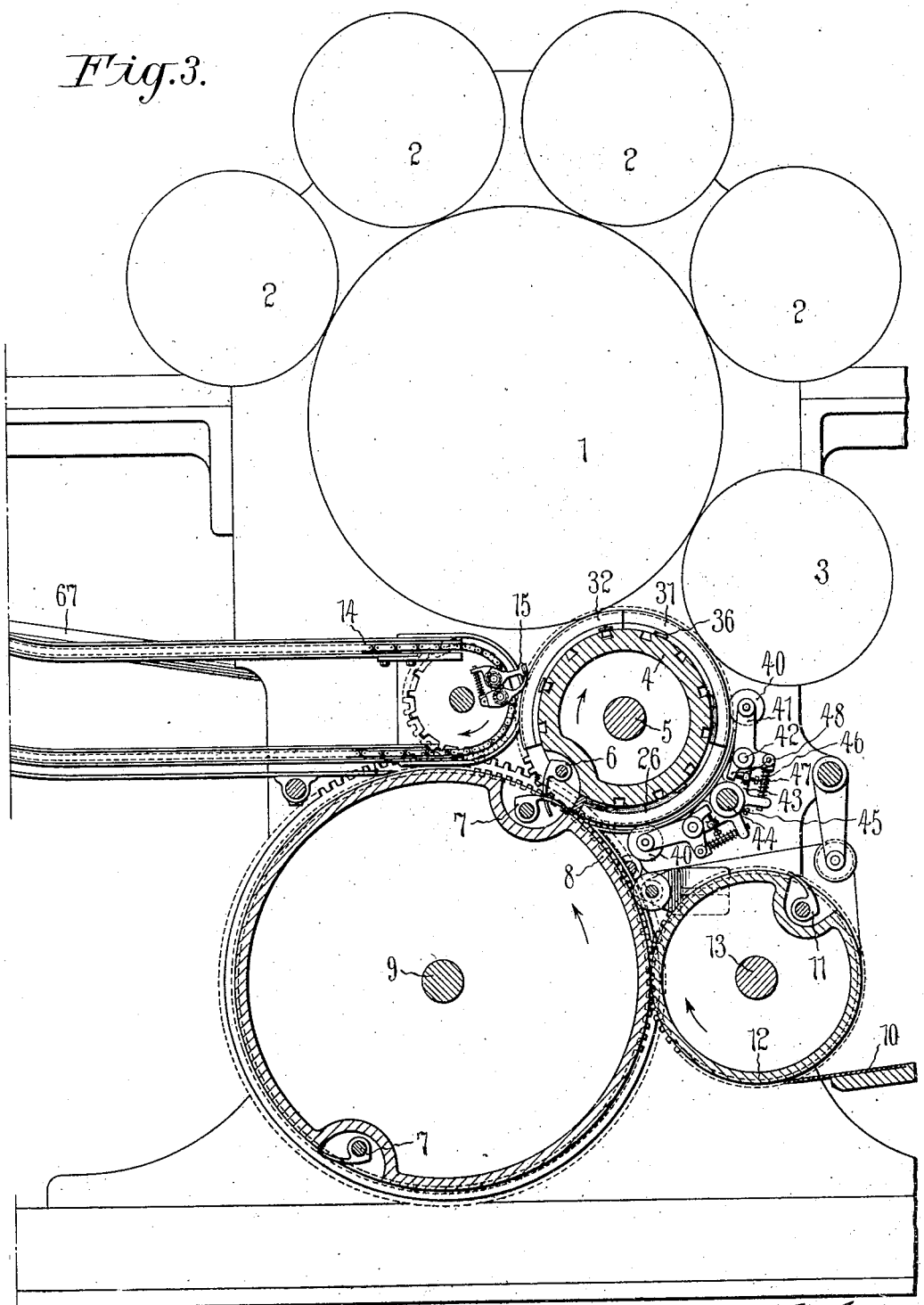
Fig. 3 is a detail view similar to Fig. 1, taken in another plane.
Figure 4:
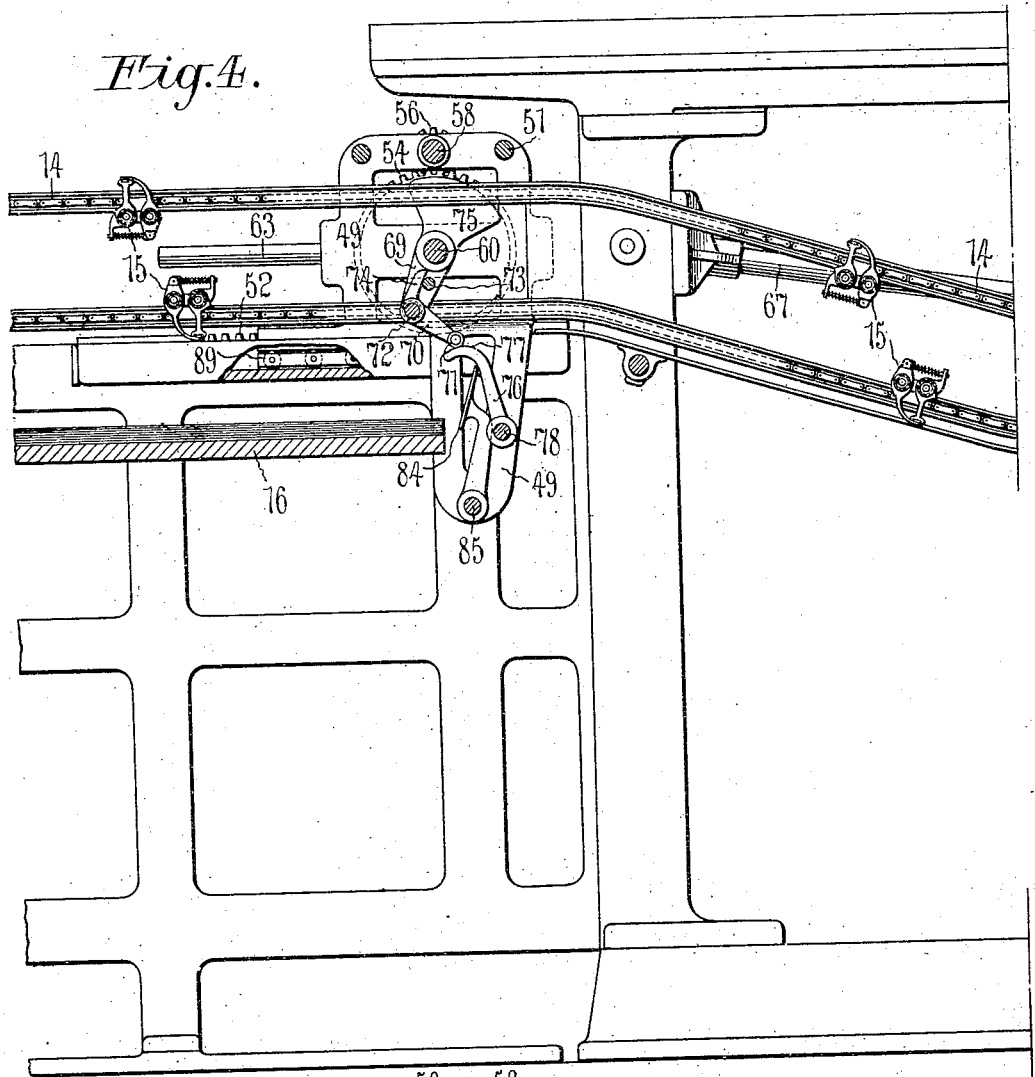
Fig. 4 is an extension of the same.

The impression cylinder is denoted by 1 and its plate cylinders by 2. The impression and plate cylinders and the means, such as the cylinder 3, for feeding sheets thereto may be of any well known and approved construction and no specific description thereof will be given.

The sheet delivery mechanism for the press includes a rotary delivery cylinder 4, mounted on a suitable shaft 5 and provided with a set of grippers 6, which grippers are arranged to take the head of the printed sheet from the impression cylinder 1, with the printed side of the sheet toward the delivery cylinder and to deliver the sheet printed side up to the grippers 7 of a cylinder 8 mounted on the shaft 9. The slip sheets are fed in from the table 10 by the grippers 11 of the rotary cylinder 12 mounted on the shaft 13, which grippers 11 coact with the grippers 7 to transfer a slip sheet thereto before the printed sheet is transferred to said grippers 7 by the grippers 6 of the delivery cylinder. In the present instance I have shown the cylinder 8 as provided with two sets of grippers 7.

An endless delivery carrier 14 is provided at intervals with grippers 15 arranged to take the advance edges of the associated slip and printed sheets and convey the sheets to a point over the delivery table 16. A cam 17 is provided for opening the grippers 15 to receive the associated slip and printed sheets from the grippers 7, and a cam 18 is provided for opening the delivery carrier grippers 15 at the proper time to release the advance edges of the associated printed and slip sheets to permit them to drop on to the delivery table 16.

The sheet illustrated in Fig. 10 is shown as provided with two continuous side margins 19, 20, lengthwise of the travel of the sheet, and also with five intermediate shorter margins 21, 22, 23, 24, 25, lengthwise of the travel of the sheet and arranged in staggered order intermediate the continuous side margins. It frequently occurs in printing that the margins lengthwise of the travel of the sheet are not continuous from the head to the tail of the sheet, and it is to provide means for successfully passing a sheet of this character around the delivery cylinder without smutting the freshly printed sheet that one phase of my invention is directed.

To accomplish this result, the delivery cylinder 4 is provided with a plurality of marginal risers which are adjustable both laterally and circumferentially on the cylinder and which correspond in length and position to the margins on the sheets to be delivered. In the present instance the marginal risers 26, 27, are arranged to engage the continuous side margins 19, 20 of the sheet illustrated, while the marginal risers 28, 29, 30, 31, 32, are arranged to engage the shorter margins 21, 22, 23, 24, 25 respectively of the sheet; the sheet thus being supported lengthwise thereof by its continuous and staggered margins as it passes around the cylinder 4.

The means which I have shown for holding the marginal risers in position around the surface of the cylinder includes clamping plates 36 engaging the risers, slidable shoes 37, spirally arranged undercut grooves 38 in the face of the cylinder and clamping screws 39 engaging the plates and shoes.

This arrangement it will be seen will permit the very rapid positioning of the marginal risers on the cylinder and will also permit the rapid insertion of risers of the desired lengths and in the desired number to correspond with sheets having different arrangements of the margins, whether continuous or staggered.

I provide means for maintaining control of the sheets on the delivery cylinder after the advance edges of the sheets have been released by the grippers 6, said means in the present instance, comprising series of friction rollers 40 carried by spring-actuated rock levers 41 pivoted at 42 to arms 43 adjustable laterally along the cross bar 44 and held in the desired adjustment by the set screws 45. The desired amount of pressure which these rollers 40 exert upon the marginal risers is adjusted by means of springs 46. It is understood that there may be one or more of these rollers 40 for each of the marginal risers, two being shown in the accompanying drawings, and also that these rollers may be prevented from pressing against the face of the cylinder when they ride off the face of the marginal risers. This latter result may be accomplished by suitable adjustable stops 47, carried by the arms 43 and arranged to be engaged by the tail pieces 48 on the rock levers 41. It is intended that these rollers 40 should coact with the marginal risers to maintain control of the printed sheets until the heads of the sheets are engaged by the delivery carrier grippers 15.

Another feature of my invention is the means for retarding the sheets from their back edges, which means can be readily adjusted for sheets of different sizes. This retarding means comprises a rotary member and an oscillating member arranged to coact therewith, the surface speeds of the two members being less than the surface speed of the delivery carrier grippers, so that when the advance edges of the sheets are released by the delivery carrier grippers 15 and the tail ends of the sheets are engaged by the coacting rotary and oscillating members, the speed of the sheet will be materially reduced by the retarding device before it is disengaged by the retarding device and permitted to fall on to the table 16. This retarding device is constructed, arranged and operated as follows:

A carriage comprising frames 49, 50, connected by cross-bars 51, is adjustable along the delivery carrier 14 by means of stationary racks 52, 53, at the sides of the machine, which racks are engaged by gears 54, 55, which gears mesh with pinions 56, 57, fixed on a shaft 58 having an operating hand wheel 59 at one side of the machine. A rotary shaft 60 is journaled in the side frames 49, 50 of the carriage, which shaft is driven through bevel gears 61, 62, from a shaft 63, which shaft in turn is driven through bevel gears 64, 65, 66, from the shaft 67. The gear 62 has a sliding interlocked engagement with the shaft 63, so that after the shaft 60 with its bevel gear 61, has been adjusted by the movement of the carriage to the desired position, the bevel gear 62 may be brought into mesh with the bevel gear 61 and secured in such position by the set screw 68. The cross-shaft 60 is provided with one or more rotary retarding members, each member comprising a rotary arm 69 carrying a spring-actuated yielding rock lever 70 provided with a stud or roller 71 at its free end. This lever is held yieldingly at the limit of its forward movement by means of a spring 72 and a stop 73 on the arm 69 which coacts with a tail piece 74 on the lever 70. This rotary arm 69 may be provided with a counterbalance 75. An oscillating member coacts with each of the rotary members, which oscillating member comprises an arm 76 having a curved surface 77 at its free end arranged to coact with a stud or roller 71 of the rotary member. This rock arm 76 is fixed to a rock shaft 78 mounted in depending portions of the side frames 49, 50. The rock arm 76 is oscillated by the rotary shaft 60, through a cam 79, the groove 80 of which engages a stud or roller 81 carried by a connecting rod 82, one end of which is connected to an arm 83 fixed to the rock shaft 78, and the other bifurcated end of which slidably embraces the rotary shaft 60.

The rear joggers for the sheets are denoted by 84, and they are fixed to a rock shaft 85, and are oscillated by the rock arm 83, through a pin and slot connection 86, 87, between the arm 83 and an arm 88 fixed to the rock shaft 85.

Figure 9:
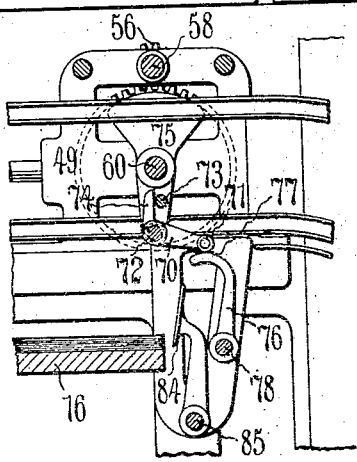
Fig. 9 is a detail section showing the coacting rotary and oscillating members of the retarding mechanism in another position from that shown in the other figures.

The relative movement of the rotary member and the oscillating member is such that the stud or roller 71 of the rotary member will come into coaction with the curved surface 77 of the oscillating member with the printed and slip sheets between them, at substantially the point shown in Fig. 9, and will release the sheets at substantially the point shown in the other figures. The side frames 49, 50, of the carriage may have anti-friction bearings 89, if so desired.

By the adjustment of the retarding device along the endless delivery carrier, I am enabled to properly position the device with respect to sheets of varying lengths so that the tail ends of the sheets will be acted upon by the retarding device to slow down the sheets as they are released from the delivery carrier grippers 15.

The cam mechanism for operating the grippers on the cylinders 4, 8 and 12, may be of any well known or approved form and will not be specifically described herein, it being understood that they are arranged to operate the grippers at the proper times to insure the travel of the sheets through the prescribed paths.

It is intended that the driving connections between the several parts may be arranged to drive the parts at the proper relative speeds, and as such driving mechanism may be of any well known or approved form, no specific description of the same will be given herein.

The features of this invention shown and described but not claimed herein, relating to the slip sheeting mechanism, forms the subject matter of my divisional application Serial No. 78662, filed February 16, 1916.

It is also obvious that when I refer to the elements 4, 8 and 12, as cylinders, I wish to include by such term reels or other equivalent means, and that also by the term "grippers", I intend to include any equivalent means.

What I claim is:

1. A sheet delivery mechanism for printing presses including an endless sheet delivery carrier and its grippers, means for transferring sheets thereto and means for retarding the sheets from their back edges as they are released from the delivery carrier grippers, said retarding means including coacting oscillating and rotating members, the retarding means being adjustable to different lengths of sheets.

2. A sheet delivery mechanism for printing presses including an endless sheet delivery carrier and its grippers, means for transferring sheets thereto, and means for retarding the sheets from their back edges as they are released from the delivery carrier grippers, said retarding means including coacting members having a yielding engagement with the tail ends of the sheets, the retarding means being adjustable to different lengths of sheets.

3. A sheet delivery mechanism for printing presses including an endless sheet delivery carrier and its grippers, means for transferring sheets thereto and means for retarding the sheets from their back edges as they are released from the delivery carrier grippers, said retarding means including an oscillating member and a rotary member having a yielding portion arranged to coact with the oscillating member to grip the tail ends of the sheets.

4. A sheet delivery mechanism for printing presses including an endless sheet delivery carrier and its grippers, means for transferring sheets thereto and means for retarding the sheets from their back edges as they are released from the delivery carrier grippers, said retarding means including an oscillating member and a rotary member having a yielding portion arranged to coact with the oscillating member to grip the tail ends of the sheets, the retarding means being adjustable to different lengths of sheets.

In testimony that I claim the foregoing as my invention I have signed my name this eighth day of September, A. D. 1915.

HOWARD M. BARBER.